US007934688B2

(12) United States Patent
Wilk et al.

(10) Patent No.: US 7,934,688 B2
(45) Date of Patent: May 3, 2011

(54) SCUBA UNIT DONNING ASSISTANCE PLATFORM

(76) Inventors: James Wilk, Haskell, NJ (US); Robert Wilk, Washington, NJ (US); Phil Ventura, Jr., Little Ferry, NJ (US)

( * ) Notice: Subject to any disclaimer, the term of this patent is extended or adjusted under 35 U.S.C. 154(b) by 364 days.

(21) Appl. No.: 10/988,153

(22) Filed: Nov. 12, 2004

(65) Prior Publication Data

US 2006/0102814 A1 May 18, 2006

(51) Int. Cl.
*F16M 11/00* (2006.01)

(52) U.S. Cl. .................... 248/177.1; 248/157; 248/507; 211/71.01

(58) Field of Classification Search .................. 248/507, 248/157, 177.1, 183.1, 186.1; 211/71.01, 211/85.18, 74, 60.1
See application file for complete search history.

(56) References Cited

U.S. PATENT DOCUMENTS

| | | | | |
|---|---|---|---|---|
| 2,054,341 | A | 9/1936 | Schroeder | |
| 2,522,036 | A * | 9/1950 | Haake | 248/145 |
| 3,062,493 | A * | 11/1962 | Gill et. al. | 248/150 |
| 3,065,857 | A | 11/1962 | Sanders | |
| 3,204,775 | A | 9/1965 | Smith et al. | |
| 3,547,391 | A | 12/1970 | Johnson et al. | |
| 3,603,550 | A | 9/1971 | Byrd | |
| 3,971,591 | A | 7/1976 | Ziaylek | |
| 4,168,007 | A | 9/1979 | Rohatensky | |
| 4,637,322 | A * | 1/1987 | Hampshire et al. | 108/102 |
| 5,025,935 | A | 6/1991 | Hadachek | |
| 5,275,462 | A | 1/1994 | Pond et al. | |
| 5,299,721 | A | 4/1994 | Cummings | |
| 5,314,233 | A | 5/1994 | Bostrom et al. | |
| 5,362,022 | A | 11/1994 | McLoughlin et al. | |
| 5,423,644 | A * | 6/1995 | First, Sr. | 410/100 |
| 5,546,885 | A | 8/1996 | Porada | |
| 5,681,080 | A | 10/1997 | Pond et al. | |
| 5,901,890 | A | 5/1999 | Stokes | |
| 5,934,749 | A | 8/1999 | Pond et al. | |
| 6,341,789 | B1 | 1/2002 | Checa et al. | |
| 6,702,242 | B1 | 3/2004 | Ziaylek, Jr. et al. | |
| 2001/0035620 | A1 | 11/2001 | Wilson | |
| 2002/0005390 | A1 | 1/2002 | DeRocher et al. | |
| 2004/0145282 | A1 | 7/2004 | Bogdan | |

* cited by examiner

*Primary Examiner* — Terrell Mckinnon
*Assistant Examiner* — Steven M Marsh
(74) *Attorney, Agent, or Firm* — Lerner, David, Littenberg, Krumholz & Mentlik, LLP

(57) ABSTRACT

A device for facilitating unassisted donning of SCUBA equipment includes at least one support, a platform connected to the at least one support for supporting at least one SCUBA tank, and a securing element in contact with the device for holding the at least one SCUBA tank in place atop the platform. The platform is height-adjustable for holding the at least one SCUBA tank at about the torso level of a diver so that the diver is able to stand upright when donning the at least one SCUBA tank.

10 Claims, 6 Drawing Sheets

FIG. 5
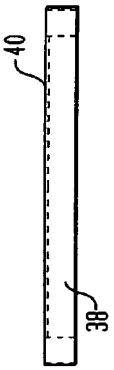
FIG. 6
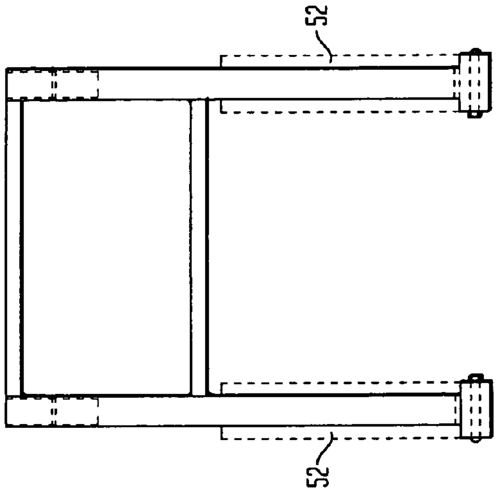
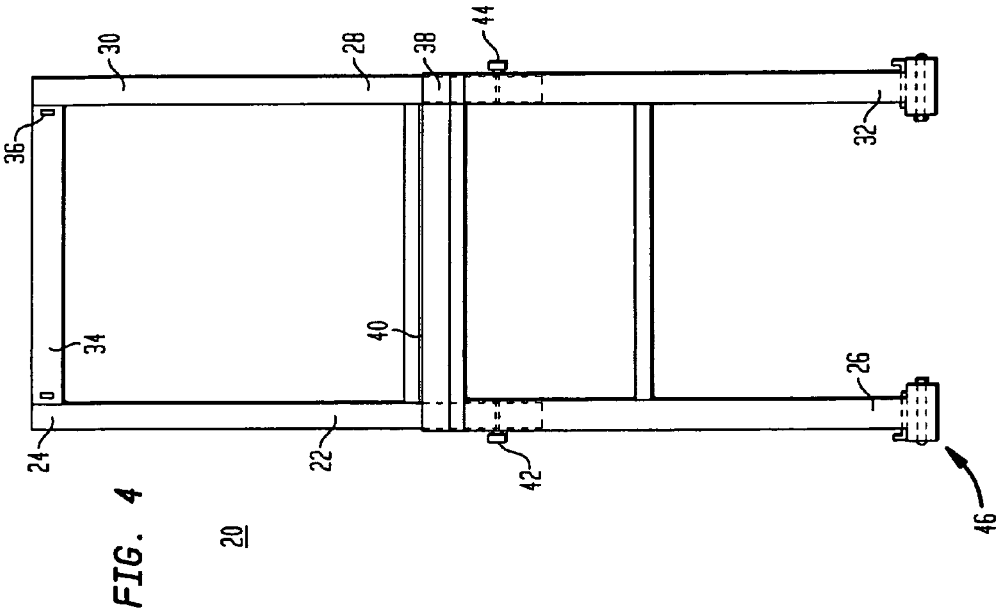
FIG. 4
20

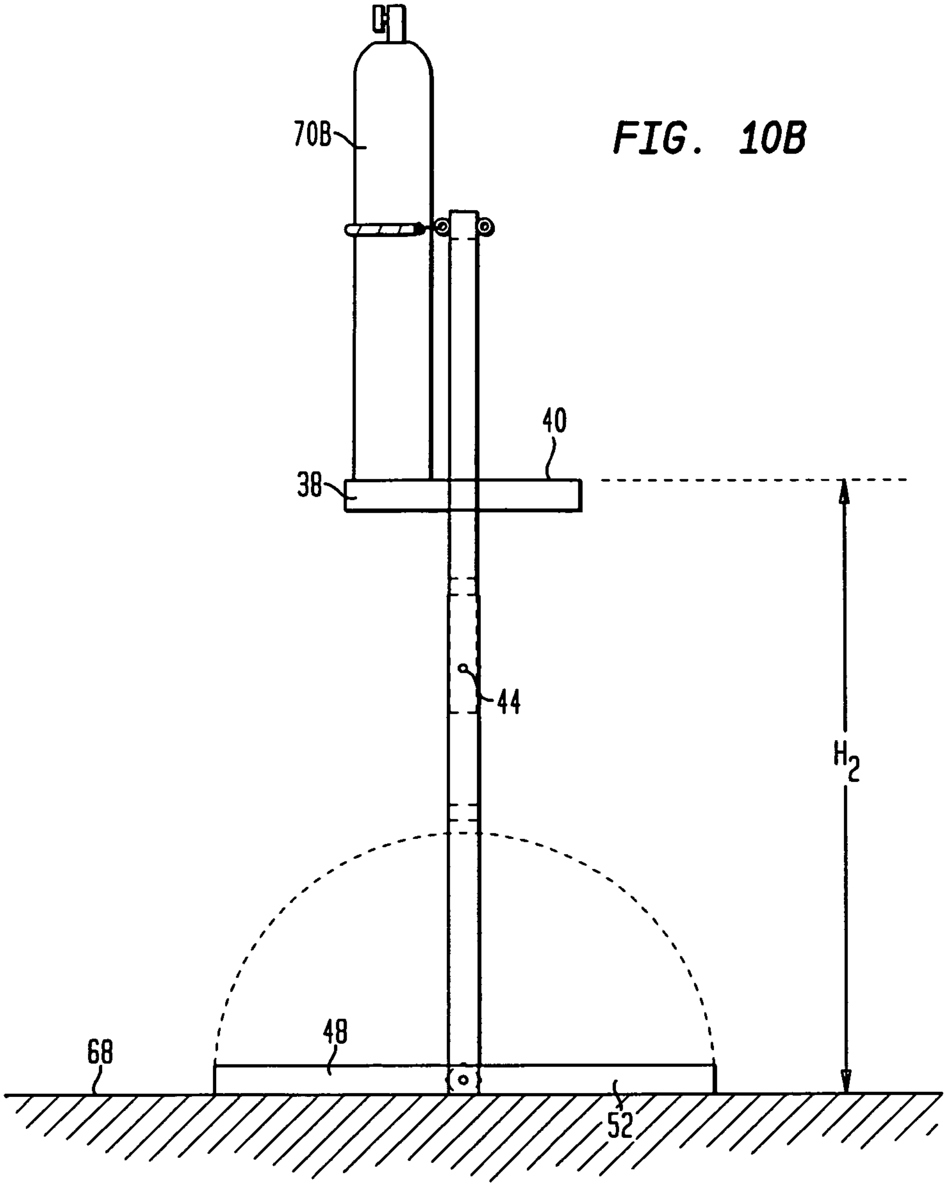
FIG. 10B
FIG. 11
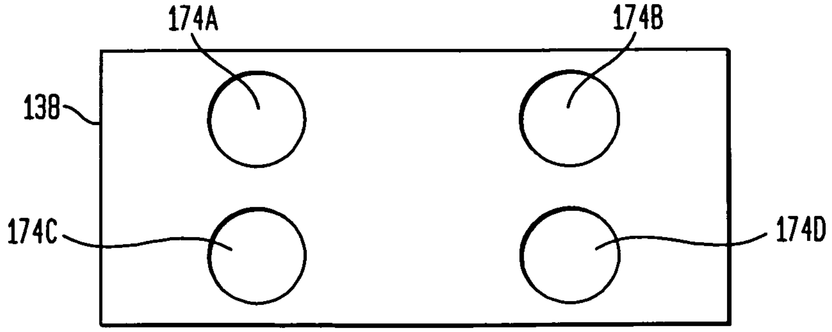

SCUBA UNIT DONNING ASSISTANCE PLATFORM

BACKGROUND OF THE INVENTION

The present application is generally directed to SCUBA equipment and is more particularly directed to securing and donning SCUBA equipment.

There have been a number of advances directed to securing, transporting and donning SCUBA equipment. For example, U.S. Pat. No. 4,168,007 to Rohatensky discloses a scuba rack for holding four scuba tanks with backpacks and regulators attached securely in place. The scuba rack is designed for securing scuba or diving tanks, with accessories attached, in an automobile, on the deck of a boat, raft or the like. A flat bottom support has four shallow cylindrical recesses in its upper surface for accommodating the bottoms of four scuba or diving tanks. The cylindrical recesses are symmetrically arranged about a rigid vertical upright post extending centrally from the bottom support. Four flexible straps are attached to the upper portion of the vertical upright and can be stretched to loop over the valve units of the respective diving tanks to force them inwardly against the vertical upright and downward securely against the bottoms of the cylindrical recesses.

U.S. Pat. No. 5,025,935 to Hadachek discloses a scuba cylinder retention rack designed to be portable and keep the cylinders in an upright position during storage or transport. The rack is designed for use in the bed of a pickup having a permanent mounting edge, but can be used anywhere a similar edge or fixture is found or installed. The vertical tube from the headpiece fits inside the vertical tube of the base and meets the spring that is housed in the base tube. When the headpiece is forced downward, the spring is compressed and the unit can be placed under the edge of the pickup bed or similar fixture. As the downward pressure on the headpiece is released, the unit expands and the edge holder on the rear of the headpiece contacts the mounting fixture. The expansion force of the spring keeps the unit securely in place. The cylinders can then be positioned in the unit and secured with a rubber strap.

U.S. Pat. No. 5,299,721 to Cummings discloses an apparatus that is positionable in a boat for holding at least one scuba tank. The apparatus includes a receptacle, a cover covering the receptacle interior and having holes for receiving scuba tanks, and lock plates adjustably mounted on side walls of the receptacle for engagement with the boat.

U.S. Pat. No. 5,546,885 to Porada discloses a plurality of interlocking rigid base sections that are insertible laterally across the floor of a dinghy and over both inflatable side tubes of the dinghy. Each base section includes a support for holding a scuba tank in an upright position. Each such support is secured to a rail, running front-to-back along the axis of the dinghy, to which the base sections are secured. The interlocking inserts provide for the secure transporting of scuba tanks in a manner that occupies little space and provides for increased stability for the dinghy.

U.S. Pat. No. 5,901,890 to Stokes discloses a support rack for use on a watercraft to hold several scuba gear and other equipment such as dive tanks, lights, radar, spear guns and a dive flag. The rack has oppositely disposed base members and a bridge structure including opposite vertical portions each attached to and extending upwardly from one of the base members. The rack also has a horizontally extending portion integral with upper end zones of the vertical portions. The opposite base members removably mount to the watercraft to support the bridge structure above the stern or gunwale. Mounting structures are provided on the base members and bridge structure for holding the gear on the rack.

U.S. Patent Application Publication No. US 2002/0005390 to DeRocher discloses a free-standing rack for hanging and supporting scuba diving or other wet equipment when not in use and particularly during cleaning, drying and storage thereof. The rack includes at least three support legs extending from a top point and a plurality of dive equipment holders attached to at least one of the supporting legs at points along its length. The rack provides a free-standing, stable structure that can be collapsed for storage when not in use and quickly and easily expanded for use in a variety of locations. The rack is storable and portable in its collapsed state. The rack is also portable in its expanded state, even with equipment supported thereon.

U.S. Patent Application Publication No. US 2004/0145282 discloses an assembly for securing SCUBA gear on a boat without increased use of deck space. A platform is disposed above the deck of a boat and a retainer is disposed above the platform. An opening, disposed within the retainer, is dimensioned to receive a SCUBA tank therein. The platform may form the upper surface of a cabinet, the cabinet having at least one SCUBA tank supporting member therein. The SCUBA tank supporting member also has a radiused surface for securely retaining the SCUBA tank within the cabinet. The support member has a first end and a second end, the first end being higher than the second end.

In spite of the above advances, there remains a need for devices for storing, transporting and donning SCUBA equipment, and especially for facilitating unassisted donning of SCUBA equipment. There particularly remains a need for devices that enable divers to don SCUBA tanks without requiring the assistance of a second person. In addition, there remains a need for a device that enables a diver to don a SCUBA tank, without assistance, while in an upright position.

SUMMARY OF THE INVENTION

In certain preferred embodiments of the present invention, a device for facilitating unassisted donning of SCUBA equipment includes at least one support, a platform connected to the at least one support for supporting at least one SCUBA tank, and a securing element in contact with the structure for holding the at least one SCUBA tank in place atop the platform. The platform is preferably height-adjustable for holding the at least one SCUBA tank at about the torso level of a diver so that the diver is able to stand upright when donning the at least one SCUBA tank.

The at least one support may include at least one vertical support having a lower end and an upper end, whereby the platform is height-adjustable between the lower and upper ends of the at least one vertical support. The lower end of the at least one vertical support preferably includes a support base, such as a horizontally extending support base for holding the device over a surface, such as the ground, a floor or the deck of a boat. The at least one vertical support may include a plurality of vertical supports adapted to hold the platform in a substantially horizontal orientation above a surface, whereby the platform is movable relative to the vertical supports for adjusting the height of the platform over a surface, such as the ground or the deck of a boat.

In certain preferred embodiments, the securing element includes an elastic member attachable to the at least one vertical support and engageable with the at least one SCUBA tank for limiting movement of the at least one SCUBA tank relative to the platform. The elastic member may include an elastic cord attachable to the at least one support and engageable with the SCUBA tank for holding the SCUBA tank securely atop the platform. The platform may include a recess or an opening adapted to receive a lower end of a SCUBA tank.

In certain preferred embodiments, the device may include hooks or loops attached to the at least one support for holding SCUBA equipment, such as gloves, flippers and masks. In other preferred embodiments, the device may include hooks or loops attached to the platform for holding SCUBA equipment.

The upper end of the at least one support may include a stop connected therewith for limiting movement of an upper end of one or more SCUBA tanks. The stop may include a header that separates one or more of the SCUBA tanks from contacting one another. In certain preferred embodiments, a plurality of SCUBA tanks are positioned atop the platform and wherein the stop extends between two or more of the SCUBA tanks.

In other preferred embodiments of the present invention, a method of donning SCUBA equipment without assistance includes providing a platform, positioning at least one SCUBA tank atop the platform, and adjusting the height of the platform so that the at least one SCUBA tank is positioned at about the torso level of a diver. The method preferably includes donning the at least one SCUBA tank while the diver is standing in an upright position. Before the adjusting step, the at least one SCUBA tank may be secured in place for preventing movement of the at least one SCUBA tank relative to the platform.

In another preferred embodiment of the present invention, a method of donning SCUBA equipment without assistance includes providing a platform, positioning SCUBA tanks atop the platform, adjusting the height of the platform so that a first one of the SCUBA tanks is provided at about the torso level of a first diver so that the first diver is able to don the first one of the SCUBA tanks while standing upright, and after the first diver dons the first one of the SCUBA tanks, re-adjusting the height of the platform so that a second one of the SCUBA tanks is provided at about the torso level of a second diver so that the second diver is able to don the second one of the SCUBA tanks while standing upright.

These and other preferred embodiments of the present invention will be described in more detail below.

BRIEF DESCRIPTION OF THE DRAWINGS

FIG. 4 shows a front elevational view of the device shown in FIG. 1.

FIG. 5 shows a front elevational view of the platform shown in FIG. 2.

FIG. 6 shows a front elevational view of a bottom section of the device shown in FIGS. 1 and 4.

FIG. 10B shows the device of FIG. 10A with the platform at a second height above the ground that is higher than the height shown in FIG. 10A.

FIG. 11 shows a top plan view of a platform for a device for securing SCUBA gear, in accordance with certain preferred embodiments of the present invention.

DETAILED DESCRIPTION

Figure 2:
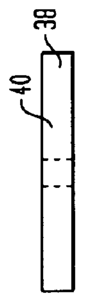
FIG. 2 shows a side elevational view of a platform for the device shown in FIG. 1.
Figure 3:
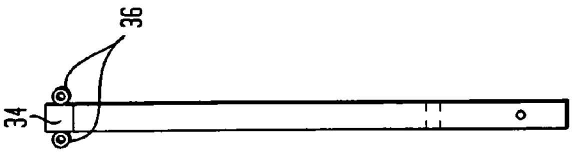
FIG. 3 shows a side elevational view of a top section of the device shown in FIG. 1.
Figure 1:
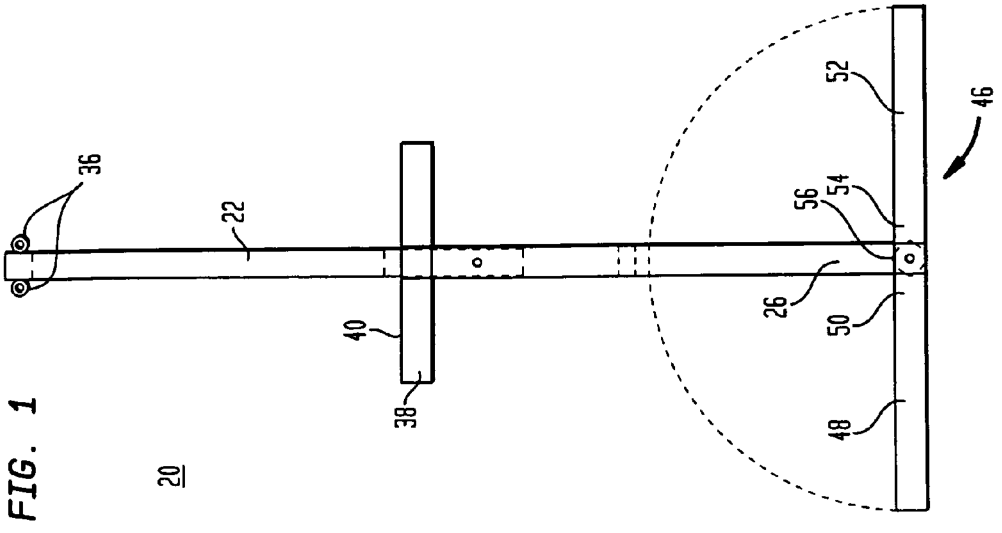
FIG. 1 shows a side elevational view of a device used for the unassisted donning of SCUBA gear, in accordance with certain preferred embodiments of the present invention.

Referring to FIGS. 1-6, in accordance with certain preferred embodiments of the present invention, a device 20 for securing SCUBA gear (not shown) includes a first vertical support 22 having an upper end 24 and a lower end 26. The device 20 also includes a second vertical support 28 having an upper end 30 and a lower end 32 remote therefrom. The device 20 includes a header 34 extending between the upper ends 24, 30 of the respective first and second vertical supports 22, 28. The header 34 includes one or more eye hooks 36 attached thereto. As will be described in more detail below, the eye hooks may be used for securing SCUBA gear such as gloves, fins and masks. The eye hooks 36 may also be used for connecting one or more securing elements to the device 20. The securing elements (not shown) may be used for securing one or more SCUBA tanks to the device.

The device 20 also preferably includes a height adjustable platform 38 having a top surface 40 that is adapted to support lower ends of SCUBA tanks. The height adjustable platform 38 is preferably movable between the lower and upper ends of the respective vertical supports 22, 28 for adjusting the height of the platform above the ground or the deck of a boat.

The device also preferably includes a first spring loaded clip 42 and a second spring loaded clip 44 that are normally in an extended position for holding the platform 38 at a selected height above the lower ends 26, 32 of the respective first and second vertical supports 22, 28. In operation, the spring loaded clips may be retracted so as to adjust the height of the platform 38. Although the present invention is not limited by any particular theory of operation, it is believed that providing a height adjustable platform will enable divers to don SCUBA tanks and equipment without assistance. This is due in part to the fact that the platform may be adjusted so that the one or more SCUBA tanks are at about the level of a diver's torso. As a result, the diver may stand in an upright position when donning the SCUBA tank. As noted above, prior art SCUBA tank storage devices require the diver to bend down or squat to pick up and don a SCUBA tank. This generally requires the assistance of a second person to lift the SCUBA tank onto the diver's back.

The device 20 also preferably includes a base 46 attached to the lower ends 26, 32 of the respective vertical supports 22, 28. The base 46 preferably includes a first footer 48 having an inner end 50 that is pivotally secured to the lower end 26 of vertical support 22. The base 46 also preferably includes a second footer 52 having an inner end 54 pivotally attached to the lower end 26 of vertical support 22. The base 46 includes a spring loaded clip 56 that may be retracted for positioning the footers 48, 52 in the orientation shown in FIG. 1 or in the upright orientation shown in FIG. 6. After the footers 48, 52 are placed in either the upright or down position, the spring loaded clip 56 is released for locking the footers in place.

Figure 8:
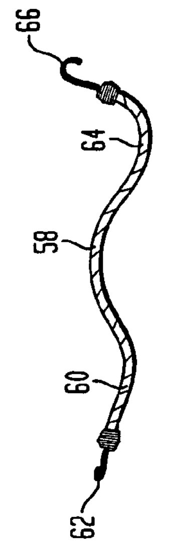
FIG. 8 shows the securing element of FIG. 7.
Figure 7:
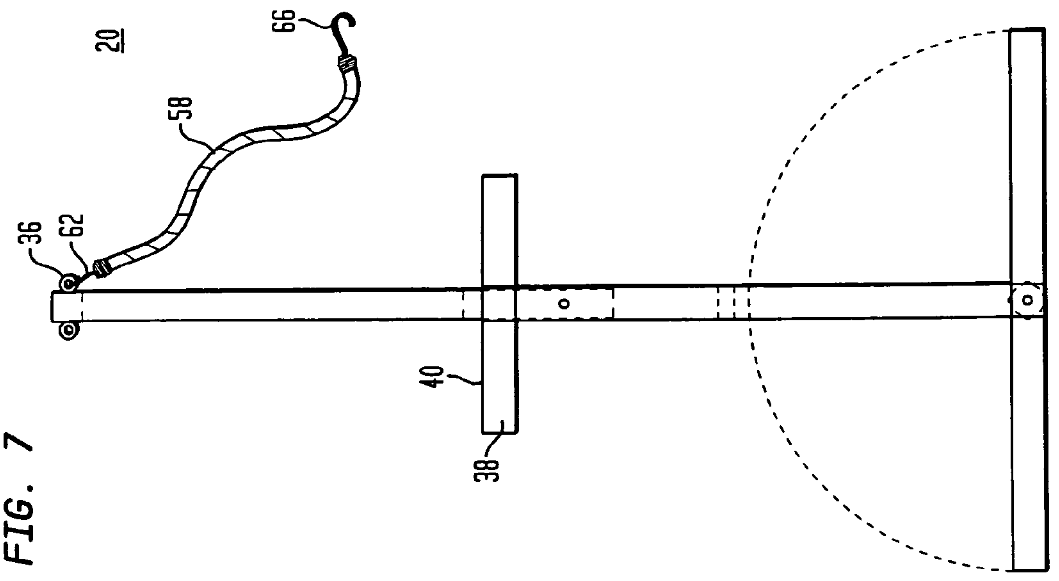
FIG. 7 shows the device of FIG. 1 including a securing element connected with the device.

FIGS. 7 and 8 show a securing element 58 having a first end 60 with a hook 62 and a second end 64 with a second hook 66. The securing element 58 preferably includes an elastic material that can be stretched and then returned to its original length. The securing element 58 may be connected with device 20 by hooking first hook 62 onto eye hook 36. A SCUBA tank may then be positioned on top surface 40 of platform 38. The securing element 58 may be passed or looped around the outer perimeter of the SCUBA tank and secured to device 20 by placing second hook 66 through a second eye hook (not shown).

Figure 9:
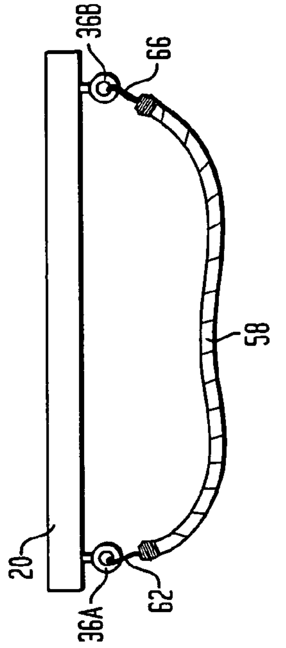
FIG. 9 shows a top plan view of the securing element of FIG. 8 being secured to the device shown in FIG. 7.

Referring to FIG. 9, first hook 62 of securing element 58 passes through a first eye hook 36A and a second hook 66 is passed through a second eye hook 36B. The securing element may then be passed around the outer perimeter of the SCUBA tank for securing the SCUBA tank to the device.

Figure 10A:
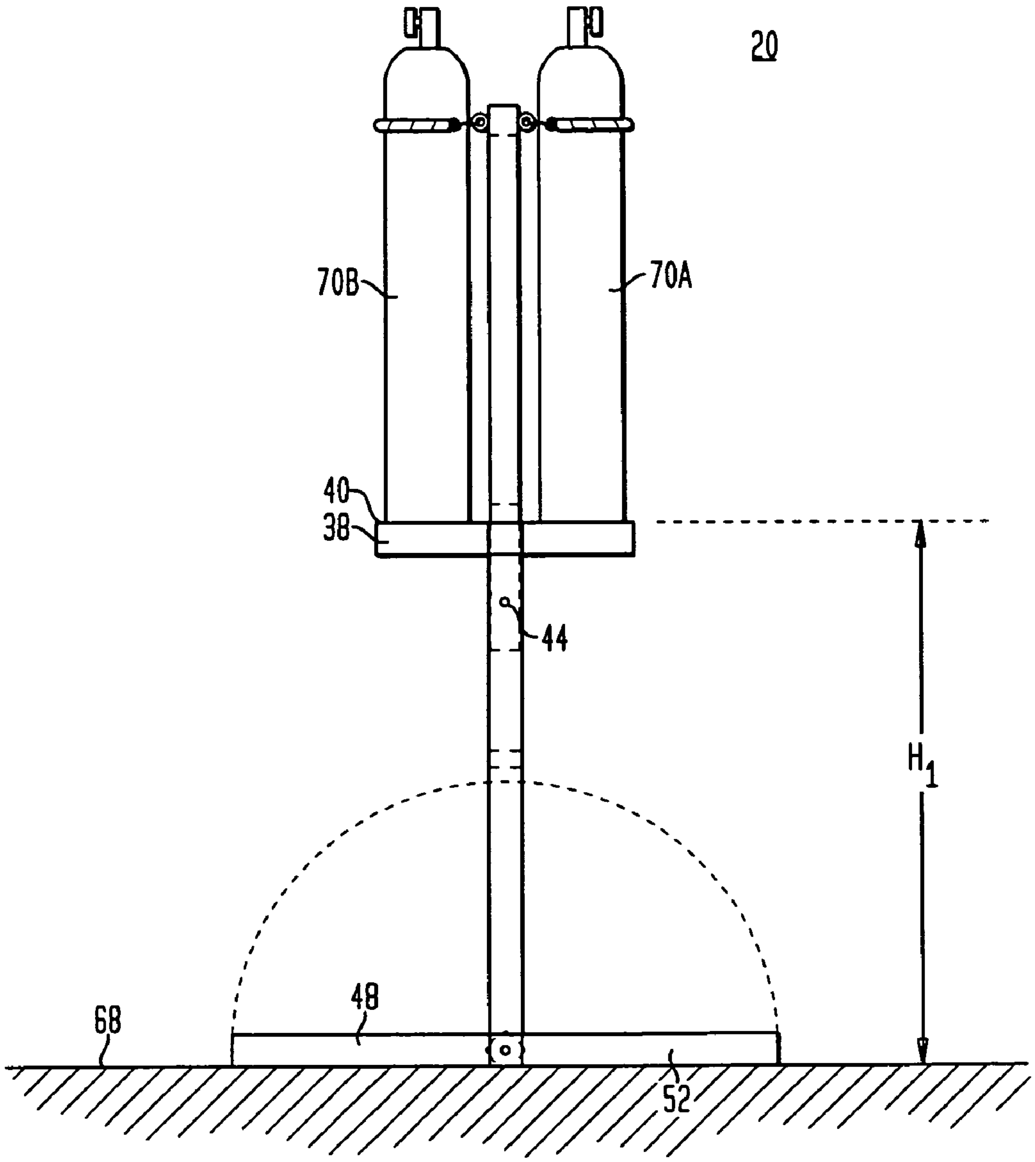
FIG. 10A shows the device of FIG. 1 with the platform at a first height above the ground.

Referring to FIGS. 10A-10B, in certain preferred embodiments of the present invention, the platform 38 is height adjustable so that one or more SCUBA tanks may be placed at preferred heights above the ground 68. Referring to FIG. 10A, a first SCUBA tank 70A and a second SCUBA tank 70B are positioned over top surface 40 of platform 38. The footers 48, 52 are locked in the down position for stably supporting device 20 over the ground 68. The spring loaded clips 42, 44 are retractable for adjusting the height of the platform 38 above the ground 68. In FIG. 10A, the top surface 40 of platform 38 is at a height $H_1$ above the ground 68. At this height, the first tank 70A is preferably at a height that is about at the level of a first diver's torso. As a result, a first diver may easily don the first SCUBA tank 70A by standing upright, positioning his or her back adjacent the first SCUBA tank 70A and donning the first SCUBA tank 70A. Because the first diver can stand in an upright position, the diver is not required by bend over or squat to don the SCUBA tank 70A. This enables the first diver to easily don the first SCUBA tank without assistance. This also avoids unnecessary strain on the diver's back and body.

After the first diver has donned the first tank 70A, the height of the platform 38 may be changed so that second SCUBA tank 70B is positioned at about the torso of a second diver. As shown in FIG. 10B, platform 38 has been raised to height $H_2$ so that top surface 40 of platform 38 is at a height $H_2$ above the ground 68. At the height shown in FIG. 10B, a second diver of a different height may easily don second SCUBA tank 70B without assistance, and while standing in an upright position that avoids unnecessary back strain.

FIG. 11 shows a top plan view of a platform 138 including four recesses or openings 174A-174D. The openings may be annular or round for accommodating the annular lower ends of SCUBA tanks. The recesses 174A-174D are adapted for receiving the lower ends of SCUBA tanks and thereby limiting undesirable movement of the tanks.

Figure 12:
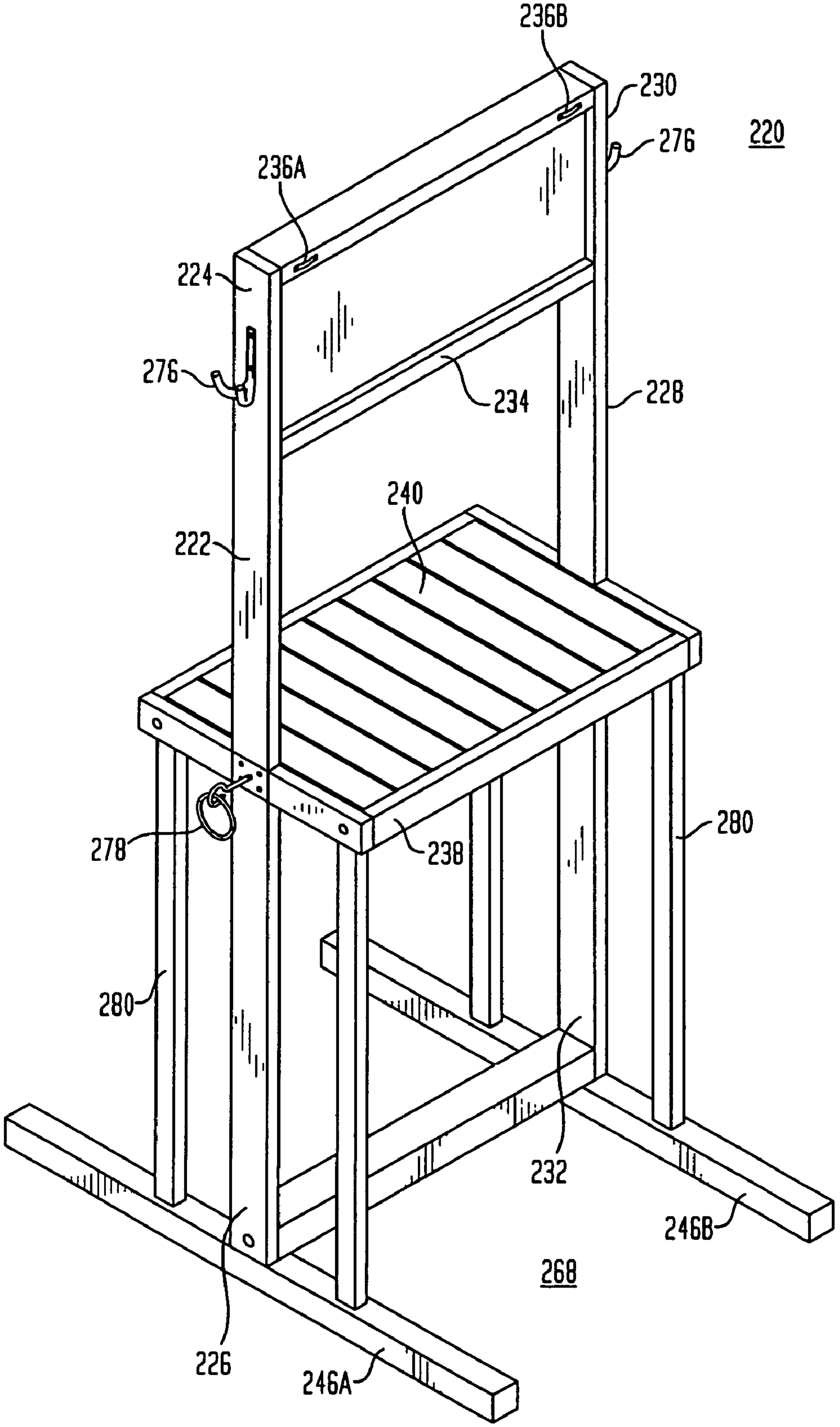
FIG. 12 shows a perspective view of a device for securing SCUBA gear, in accordance with still further preferred embodiments of the present invention.

FIG. 12 shows a device 220 that enables unassisted donning of SCUBA gear, in accordance with another preferred embodiments of the present invention. The device includes a first vertical support 222 having an having an upper end 224 and a lower end 226 remote therefrom. The device 220 also includes a second vertical support 228 having an upper end 230 and a lower end 232 remote therefrom. The device 220 includes a pair of footers 246A, 246B that provides stability at the lower ends 226, 232 of the first and second vertical supports 222, 228. Device 220 also includes a platform 238 having a top surface 240 adapted to receive the bottom ends of SCUBA tanks (not shown). Device 220 also preferably includes a header 234 that is connected with and extends between the upper ends 224, 230 of the respective first and second vertical supports 222, 228. The header preferably includes eye hooks 236A, 236B. As described above, the eye hooks may be adapted to receive the opposing ends of an elastic securing element for holding upper ends of SCUBA tanks against header 234.

Device 220 also preferably includes J-hooks 276 attached to the vertical supports 222, 228 for securing SCUBA gear such as gloves, fins, masks, etc. Device 220 also preferably includes one or more eye hooks 278 secured to platform 238. The eye hooks 278 may secure SCUBA gear such as gloves and fins as well.

The device 220 may also include supplemental vertical supports 280 extending between platform 238 and base 246 for providing additional stability for platform 238. Although the particular embodiment shown in FIG. 12 does not include a height adjustable platform 238, it is contemplated that the platform may be modified so that it is height adjustable above the ground 268, which will provide a height adjustable platform, which will accommodate divers of various heights with unassisted donning of SCUBA gear.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A device for facilitating unassisted donning of SCUBA equipment comprising:

at least one vertical support;

a platform connected to said at least one vertical support such that at least one SCUBA tank may rest on top of said platform;

a securing element in contact with said at least one vertical support for holding said at least one SCUBA tank in place atop said platform, wherein said platform is height-adjustable in relation to said at least one vertical support for holding said at least one SCUBA tank at about the torso level of a diver so that the diver is able to stand upright when donning said at least one SCUBA tank;

said platform further including at least one recess or opening that is adapted to receive the bottom end of said at least one SCUBA tank;

wherein the lower end of at least one of said at least one vertical support includes a support base connected thereto, said support base being rotatable independently of said at least one vertical support for storage while maintaining connection thereto.

2. The device as claimed in claim 1, wherein said at least one support comprises at least one vertical support having a lower end and an upper end, said platform being height-adjustable between the lower and upper ends of said at least one vertical support.

3. The device as claimed in claim 2, wherein said securing element includes an elastic member attachable to said at least one vertical support and engageable with said at least one SCUBA tank for limiting movement of said at least one SCUBA tank relative to said platform.

4. The device as claimed in claim 1, further comprising hooks or loops attached to said at least one vertical support for holding SCUBA equipment.

5. The device as claimed in claim 2, further comprising a stop connected with the upper end of said at least one vertical support for limiting movement of an upper end of said at least one SCUBA tank.

6. The device as claimed in claim 5, wherein said at least one SCUBA tank comprises a plurality of SCUBA tanks positioned atop said platform and wherein said stop is extendible between two or more of said SCUBA tanks.

7. The device as claimed in claim 1, wherein said at least one vertical support comprises a plurality of supports adapted to hold said platform in a substantially horizontal orientation above a surface, wherein said platform is movable relative to said supports for adjusting the height of said platform over the surface.

8. The device of claim 1, wherein said device is portable.

9. The device of claim 1, wherein said at least one support base is adapted to move between an open position and a closed position, said support base being parallel to said platform in said open position, and said support base being aligned with said support when in said closed position.

10. The device of claim 1, wherein said recess is round or annular.

* * * * *